US012664038B2

(12) United States Patent
Walch

(10) Patent No.: US 12,664,038 B2
(45) Date of Patent: Jun. 23, 2026

(54) SANITARY TECHNOLOGY DIAGNOSTIC SYSTEM AND METHOD

(71) Applicant: Geberit International AG, Jona (CH)

(72) Inventor: Christoph Walch, Jona (CH)

(73) Assignee: GEBERIT INTERNATIONAL AG, Jona (CH)

( * ) Notice: Subject to any disclaimer, the term of this patent is extended or adjusted under 35 U.S.C. 154(b) by 94 days.

(21) Appl. No.: 18/587,592

(22) Filed: Feb. 26, 2024

(65) Prior Publication Data

US 2024/0289198 A1 Aug. 29, 2024

(30) Foreign Application Priority Data

Feb. 27, 2023 (EP) ..................................... 23158779

(51) Int. Cl.
*G06Q 30/00* (2023.01)
*G06F 11/07* (2006.01)
*G06F 11/14* (2006.01)
*G06F 11/34* (2006.01)

(52) U.S. Cl.
CPC ........ *G06F 11/0769* (2013.01); *G06F 11/142* (2013.01); *G06F 11/3476* (2013.01)

(58) Field of Classification Search
CPC ............... G06F 11/0769; G06F 11/142; G06F 11/3476; G06Q 10/20
See application file for complete search history.

(56) References Cited

U.S. PATENT DOCUMENTS

| | | | | |
|---|---|---|---|---|
| 9,830,565 | B2 * | 11/2017 | O'Toole | G06Q 10/06 |
| 11,598,544 | B1 * | 3/2023 | Schubert | G05D 23/1917 |
| 12,135,535 | B2 * | 11/2024 | Bradley | G10L 15/22 |
| 2003/0210140 | A1 * | 11/2003 | Menard | E03D 7/00 |
| | | | | 340/531 |

(Continued)

FOREIGN PATENT DOCUMENTS

| | | | | |
|---|---|---|---|---|
| WO | WO-2008098281 A1 * | 8/2008 | | H04Q 9/00 |
| WO | WO-2009061857 A2 * | 5/2009 | ..... | G06Q 10/063114 |

(Continued)

OTHER PUBLICATIONS

Lokman, Amar, et al. "Scheduling and Predictive Maintenance for Smart Toilet." IEEE Access, vol. 11, Feb. 3, 2023. (Year: 2023).*

(Continued)

*Primary Examiner* — Luis A Brown
(74) *Attorney, Agent, or Firm* — Perkins Coie LLP

(57) ABSTRACT

A sanitary technology diagnostic system comprises at least one sanitary device, a user device, a server device, and a diagnostic device. The user device is adapted to request and receive device information linked to an identifier of the at least one sanitary device from the at least one sanitary device, to generate a service number, to send a data set comprising the service number and the received device information to the server device, and to send a notification comprising the service number, to send a data set comprising the service number and the received device information to the server device, and to send a notification comprising the service number, the server device being adapted to receive and store the data set, the diagnostic device being adapted to receive the notification and, using the service number, to request and receive the data set from the server device.

20 Claims, 3 Drawing Sheets

(56)  References Cited

U.S. PATENT DOCUMENTS

| | | | | |
|---|---|---|---|---|
| 2014/0373263 | A1* | 12/2014 | Plate ......................... | E03D 9/00 |
| | | | | 4/300 |
| 2015/0127174 | A1* | 5/2015 | Quam ..................... | H04L 67/10 |
| | | | | 700/275 |
| 2017/0207926 | A1* | 7/2017 | Gil ......................... | H04L 12/282 |
| 2018/0094775 | A1* | 4/2018 | Jacobson ................ | F17D 5/005 |
| 2018/0102958 | A1* | 4/2018 | Guthrie .................. | G06Q 10/10 |
| 2019/0129780 | A1* | 5/2019 | DelSordo ............ | G06F 11/0769 |
| 2021/0157340 | A1* | 5/2021 | Heydari .................... | E03D 3/12 |
| 2023/0162160 | A1* | 5/2023 | Quraishi ................ | G06Q 10/20 |
| | | | | 705/7.23 |
| 2024/0070574 | A1* | 2/2024 | Sarkar ............ | G06Q 10/063112 |
| 2024/0218643 | A1* | 7/2024 | Jovel ..................... | G01F 15/063 |

FOREIGN PATENT DOCUMENTS

| | | | | | |
|---|---|---|---|---|---|
| WO | WO-2020028798 | A1 | * | 2/2020 | ............. G06Q 10/20 |
| WO | WO-2022251105 | A1 | * | 12/2022 | ............. E03C 1/057 |

OTHER PUBLICATIONS

Lokman, Amar, et al. "Scheduling and Predictive Maintenance for Smart Toilet." IEEE Access, vol. 11, Feb. 2023. Amar, (Year: 2023).*
Cid, Clement, et al. "Self-Diagnosis and Smart Maintenance Prototype for Sustainable and Desirable Onsite Sanitation." 2020 IEEE Global Humanitarian, Technology Conference, 2020. (Year: 2020).*
European Search Report dated Aug. 21, 2023 cited in EP Application No. 23158779.1, 9 pages.

* cited by examiner

SANITARY TECHNOLOGY DIAGNOSTIC SYSTEM AND METHOD

TECHNICAL FIELD

The present disclosure relates to a sanitary technology diagnostic system and method.

BACKGROUND

Sanitary devices such as toilets, urinals, washbasin fittings, hygiene flushes and the like are known from the state of the art, which offer extended functionality and allow users, for example, to configure them with regard to the operating parameters to be used. Incorrect configurations, for example, can lead to malfunctioning of the devices. In such a case, users are often unable to identify and rectify an existing problem themselves. Users are therefore dependent on external support, for example from customer service staff.

To date, such support has mainly been provided by telephone, making it difficult for customer service employees to identify the device actually used by a user without any doubt or to identify the cause of a possible defect or incorrect setting. This is due to the fact that many products are visually very similar, although their functionality can sometimes differ considerably and the customer cannot describe the problem precisely. For this reason, users may incorrectly identify the product used or the fault, resulting in a failure to resolve the problem. Customer service employees then have to identify and solve the problem on site at the user's premises, resulting in high costs.

DETAILED DESCRIPTION

Figure 1:
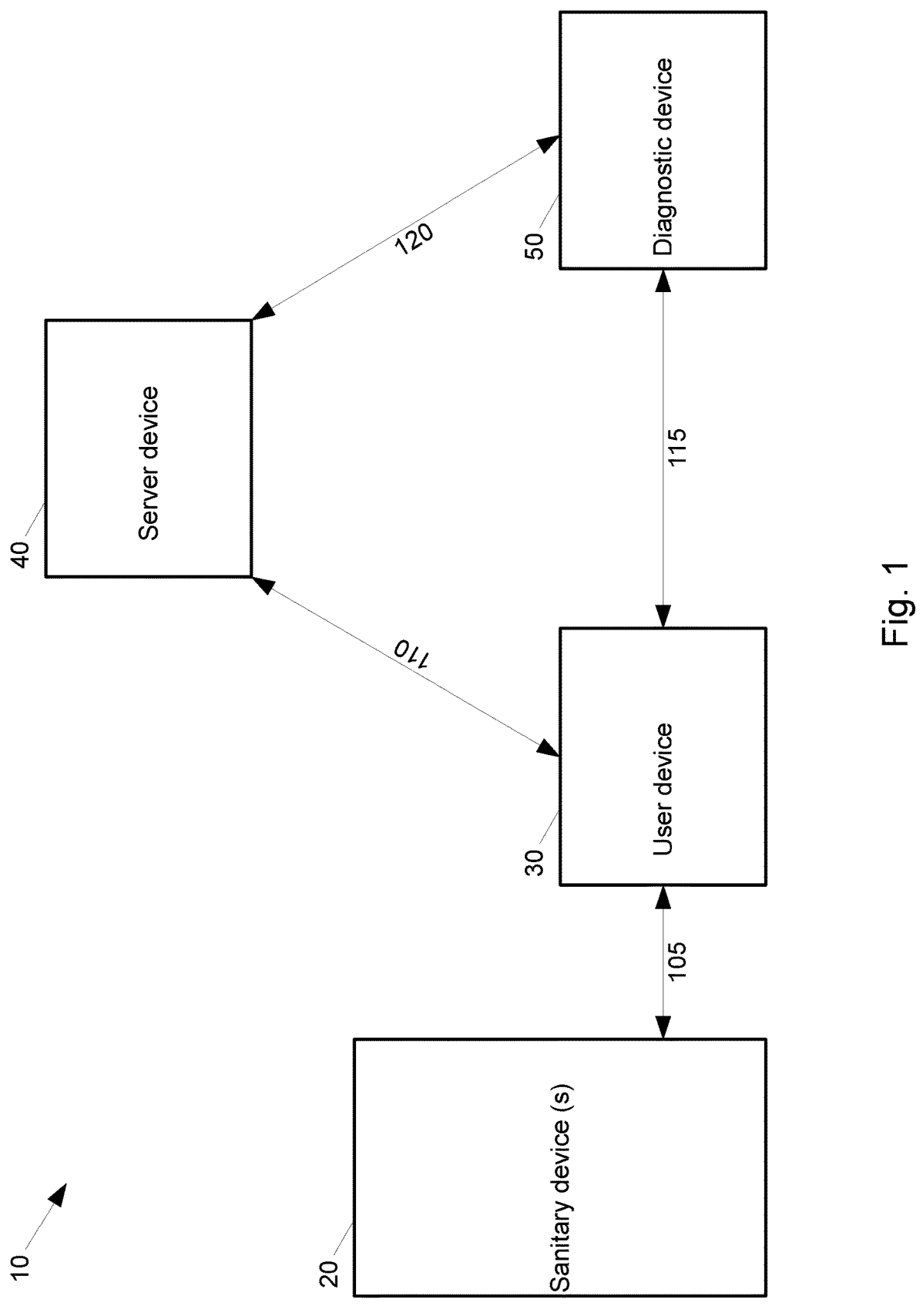
FIG. 1 is a schematic block diagram of an example of a sanitary technology diagnostic system.

The solution introduced here ("the solution") enables customer service employees to quickly and unequivocally identify a user's sanitary devices affected by problems, even if information or error descriptions identified by the user himself are incomplete and/or incorrect. According to the solution, this problem can be solved by a sanitary technology diagnostic system comprising at least one sanitary device, a user device, a server device and a diagnostic device. The user device is adapted to request and receive device information linked to an identifier of the at least one sanitary device from the at least one sanitary device, to generate a service number, to send a data set comprising the service number and the received device information to the server device and to send a notification comprising the service number. Furthermore, the server device is adapted to receive and store the data set. The diagnostic device, on the other hand, is adapted to receive the notification and to request and receive the data set from the server device using the service number.

A mobile terminal, for example a user's smartphone, can be regarded as a user device, whereas an infrastructure accessible via the Internet, for example a so-called cloud infrastructure, can be regarded as a server device. Alternatively, the user device can be a tablet, laptop computer, or other form of personal processing device. The diagnostic device, on the other hand, can be realized by a terminal of a customer service employee, for example a computer, a tablet or the like, and use corresponding software (e.g., a "Service WebApp").

The above solution is based on the realization that the storage of an identifier of the at least one sanitary device together with a service number makes it possible to clearly assign a problem complained about by a user in relation to a product. Since the device information received from the at least one sanitary device is also stored in a corresponding data set, it is possible for the diagnostic device assigned to a customer service employee to determine indications of the problem with the at least one sanitary device. Accordingly, an objective view of the current problematic state of the at least one sanitary device is provided on the basis of the transmitted identifier and the transmitted device information, which may include error codes or event logs, for example, by use of which conclusions can be drawn about the cause of the malfunction of a sanitary device or topology errors can be detected.

A particular advantage of the proposed solution is that, due to a local connection between the user device and the at least one sanitary device, information can also be transmitted to products that do not have their own access to the Internet. This is the case, for example, for products that can only communicate via Bluetooth.

Advantageously, the diagnostic device is also adapted to create a configuration for the at least one sanitary device and send it to the server device for storage. Providing the configuration by use of the server device has the advantage that a user can access the stored configuration with the user device at any time. The user device can access the configuration stored by the server device, which can also include a firmware update for the at least one sanitary device, for example by use of a corresponding application installed on a smartphone (e.g., a "control app").

Preferably, the user device is also adapted to request and receive the configuration from the server device and, preferably depending on a user input, to send it to the at least one sanitary device. The advantage of transmitting the configuration to the at least one sanitary device only after approval by a user is that changes proposed by a customer service employee do not necessarily have to be accepted. Furthermore, the user can in this way determine the time at which the configuration is sent to the at least one sanitary device, so that, for example, unusability that occurs while the configuration is being loaded onto the at least one sanitary device can be taken into account.

In at least one embodiment, the received device information comprises at least one error code relating to the at least one sanitary device. By use of an error code, it is possible for the diagnostic device to quickly and reliably identify the causes of an error behavior or problem of the at least one sanitary device. For this purpose, the diagnostic device may have a database of all error codes for a large number of different sanitary devices.

Advantageously, the received device information comprises at least one log file relating to the at least one sanitary device. Log files make it possible to evaluate how the at least one sanitary device was used, making it possible to identify possible causes of errors.

Preferably, the data set comprising the device information also contains a fault description. Such a fault description can be provided by a user at the request of the user device by use of appropriate input means and can help to identify a problem. The diagnostic device can evaluate the error description provided by a customer service employee and/or computer-aided, for example by AI-supported text recognition.

In at least one embodiment, the user device is adapted to send the notification comprising the service number to the server device and/or to the diagnostic device. The advantage of sending the notification directly to the diagnostic device, for example by e-mail, messenger service, SMS or the like, is that time delays are minimized. Sending to the server device, on the other hand, is advantageous if the diagnostic device works according to a so-called publish-subscribe method. It may also be possible to send the notification via both of the aforementioned variants in order to create redundancy.

Advantageously, in the event that the notification is sent to the server device, the diagnostic device is adapted to check the server device for the presence of the notification. A check can be carried out as part of the aforementioned publish-subscribe method, wherein the server device represents a publisher and the diagnostic device represents a subscriber.

The diagnostic device can also be adapted to send a further notification to the user device. This further notification may have been initiated, for example, by a customer service employee and may inform a user that the problem reported by the user is currently being analyzed. The further notification can also be sent directly from the diagnostic device to the user device, for example by e-mail, messenger service, SMS or the like, and/or to the server device from which the user device retrieves it, for example as part of a publish-subscribe method.

In at least one embodiment, communication between the at least one sanitary device and the user device is provided wirelessly via Bluetooth. This has the advantage that increased security can be guaranteed, since in such an embodiment the at least one sanitary device cannot be reached directly via the Internet and is therefore protected from potential attackers. It can therefore be provided that only user devices that have previously been locally coupled to the at least one sanitary device can access it.

Advantageously, communication between the at least one sanitary device and the user device is provided by use of a gateway, with communication between the at least one sanitary device and the gateway being wireless, such as via Bluetooth, or wired, and communication between the gateway and the user device being wireless via Bluetooth. The use of a gateway, which is connected between the at least one sanitary device and the user device, has the advantage that security can be further increased, since potential attackers must first overcome the gateway in order to gain access to the at least one sanitary device. Furthermore, a gateway can be used to manage a large number of sanitary devices so that the user device only has to instruct the gateway to obtain information instead of having to communicate with each individual sanitary device itself.

Preferably, only the user device, the server device and the diagnostic device are adapted to establish a direct connection to the Internet. In other words, the at least one sanitary device and the gateway are only accessible locally via the user device.

Furthermore, the aforementioned problem can be solved according to the solution introduced here by a sanitary technology diagnostic method comprising the following method steps: Requesting and receiving device information linked to an identifier of at least one sanitary device from the at least one sanitary device by a user device, generating a service number by the user device, sending a data set comprising the service number and the device information to a server device by the user device, storing the received data set by the server device, sending a notification comprising the service number by the user device, receiving the notification by the diagnostic device, and requesting and receiving the data set from the server device using the service number by the diagnostic device.

Advantageously, the method further comprises creating a configuration for the at least one sanitary device by the diagnostic device and sending the configuration to the server device for storage by the diagnostic device. By use of a configuration created by the diagnostic device, the problem reported by a user can potentially be solved.

The method further can comprise requesting and receiving the configuration from the server device by the user device and sending the configuration to the at least one sanitary device, preferably depending on a user input. As explained above, an approval required from the user has the advantage that changes proposed by a customer service employee do not necessarily have to be accepted and the user can determine the time of sending the configuration to the at least one sanitary device.

Further details, features and advantages of the solution introduced here are explained in more detail with reference to the following embodiment examples.

FIG. 1 shows an embodiment example of a sanitary technology diagnostic system 10 according to the solution introduced here, which in the present case comprises at least one sanitary device 20, a user device 30, a server device 40 and a diagnostic device 50.

The at least one sanitary device 20 is connected to the user device 30 via a communication path 105. A corresponding communication is preferably wireless, for example via Bluetooth. However, the present disclosure is not limited thereto, so that other communication options such as via ZigBee, WLAN, Matter (previously Project Connected Home over IP, CHIP) and the like may also be provided.

Furthermore, the user device 30 has a communication path 110 to the server device 40. This communication path 110 can, for example, be a data connection according to 3G/UMTS, 4G/LTE and/or 5G/NR or a data connection via WLAN communication. The server device 40 is operated, for example, by a manufacturer of the at least one sanitary device 20 and is accessible via the Internet.

Furthermore, the user device 30 is directly connected to the diagnostic device 50 via the communication path 115. The communication path 115 can, for example, be realized as a data connection using e-mail or a messenger service or via SMS over a 2G/GSM mobile network.

The diagnostic device 50 is also connected to the server device 40 via a communication path 120, which enables a data connection. Since the server device 40 and the diagnostic device 50 are preferably both arranged in a network operated by the manufacturer of the at least one sanitary device 20, a LAN connection may be provided for this purpose. However, the present disclosure is not limited thereto, so that other connection possibilities may also be provided, in particular if the server device 40 and the diagnostic device 50 are not arranged in close proximity to one another.

By use of the communication paths 110 and 120, a data set is transmitted from the user device 30 to the diagnostic device 50, which comprises a service number generated by the user device 30 and device information received from the at least one sanitary device 20. The data set may further comprise a customer ID provided by the user device 30. Such a customer ID is generated, for example, when a user of a smartphone acting as user device 30 registers in a corresponding application installed on it, which is used for communication with the at least one sanitary device 20 and the server device 40. When registering, the user provides personal information such as name, address, telephone number and e-mail address.

The communication path 115, on the other hand, is intended exclusively for exchanging notifications between the user device 30 and the diagnostic device 50, for example a notification directed to the diagnostic device 50 that a service case or a service request relating to a problem with the at least one sanitary device 20 has been stored in the server device 40, or a notification directed to the user device 30 that the aforementioned service case is being processed.

Figure 2:
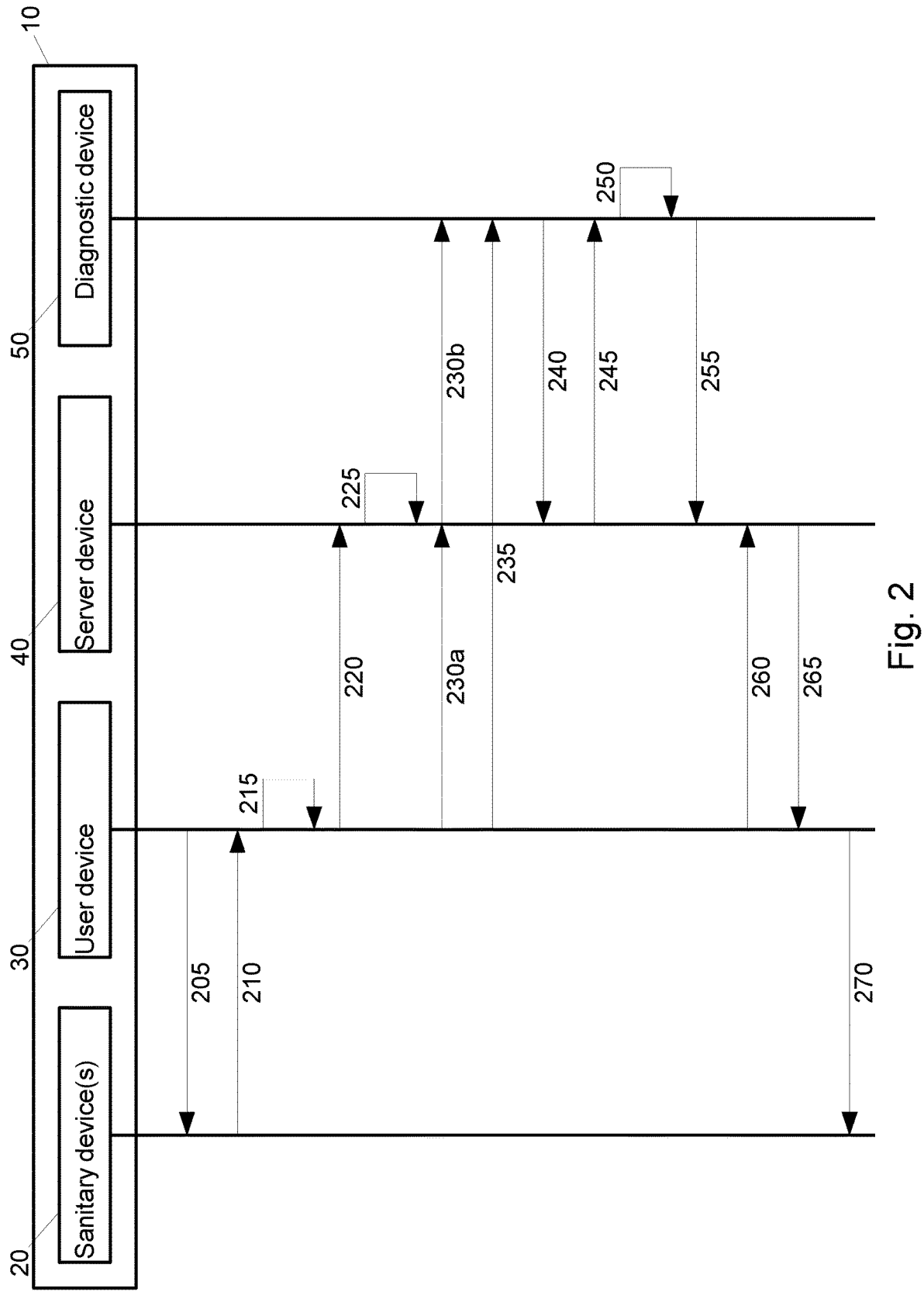
FIG. 2 is a flowchart showing an example of steps executed within the sanitary technology diagnostic system.

FIG. 2 shows an embodiment example of method steps which can be carried out between the devices of the sanitary technology diagnostic system 10 according to the solution introduced here. First, in step 205, a user device 30 requests device information linked to an identifier of the at least one sanitary device 20 from at least one sanitary device 20. The request can be triggered, for example, by use of an application installed on a smartphone acting as user device 30. This can take place after a user has detected a problem with the at least one sanitary device 20, whereupon a user input is made to select the at least one sanitary device 20.

Subsequently, the device information from the at least one sanitary device 20, which is linked to the identifier of the at least one sanitary device 20, is received by the user device 30 in step 210. In this case, if the user has selected more than one sanitary device 20, the device information of each selected sanitary device 20 is received together with the corresponding identifier.

The user device 30 then generates a service number in step 215. This step does not necessarily have to take place after receipt of the device information, but can also precede receipt of the device information.

As soon as the received device information and the generated service number are available, the user device generates a data set and sends it in step 220 to a server device 40, which is operated, for example, by the manufacturer of the at least one sanitary device 20. If device information of several sanitary devices 20 has been received, the data set contains all of this device information with an assignment to a corresponding identifier of the respective sanitary device 20. The device information may comprise one or more error codes relating to a respective sanitary device 20 and/or at least one log file relating to a respective sanitary device 20. In addition, the data set may contain an error description, which is supplemented on the basis of a corresponding user input received from the user device 30. Such an error description is in text form and reflects a problem experienced by the user of the user device 30 with the least one sanitary device 20 in the words of the user. Furthermore, it may be provided that multimedia content captured by the user of the user device 30, such as images and/or videos, supplement the error description. The data set sent to the server device 40 in step 220 may further comprise a customer ID that was assigned to a user as part of a registration.

In step 225, the data set is received and stored by the server device 40. Accordingly, the information relating to a problem is now stored in an infrastructure accessible via the Internet, for example a so-called cloud infrastructure.

So that a diagnostic device 50 is informed of the existence of a corresponding new service case, in step 230*a* or 235 the user device 30 sends a notification comprising the service number. It is possible to send a notification directly from the user device 30 to the diagnostic device 50 in accordance with step 235, for example by e-mail, or to send a notification to the server device 40 in accordance with step 230*a*, which then transmits the notification from the server device 40 to the diagnostic device 50 in accordance with step 230*b*. The latter variant can be designed as a publish-subscribe method, in which the server device 40 is the publisher and the diagnostic device 50 is the subscriber.

In any case, the diagnostic device 50 then receives the notification in step 230*b* or 235, so that a customer service employee operating the diagnostic device 50 is informed of the existence of a new service case or a new service request.

Using the service number, the data set is requested from the server device 40 in step 240 and received by the diagnostic device 50 in step 245. This can take place with or without the intervention of a customer service employee. The diagnostic device 50 is then able to analyze the problem reported by the user. A corresponding analysis can be carried out either fully automatically by comparing error codes present in the data set with a database containing error codes and corresponding problem solutions, or by a customer service employee carrying out at least partial analysis processes.

Subsequently, the diagnostic device 50 creates a configuration for the at least one sanitary device 20 in step 250 and sends it to the server device 40 for storage in step 255. A configuration may comprise instructions for configuring only one sanitary device 20 as well as instructions for configuring several sanitary devices 20, the corresponding instructions being assigned to the respective sanitary device 20 by use of identifiers. The configuration is stored on the server device after completion of the aforementioned step.

The user device 30 is further adapted to request the configuration from the server device 40 in step 260 and to receive it in step 265. If, for example, a smartphone with a corresponding application is used as the user device 30, the application can examiner whether the server device 40 has a configuration ready after starting it. The service number, which is already assigned to the service case or service request, is again used to identify this configuration. These two steps can be initiated, for example, after the user device 30 has been notified by the diagnostic device 50 that a service case has been fully processed (not shown in FIG. 2).

In step 270, the configuration is sent from the user device to the at least one sanitary device 20. Sending takes place, for example, depending on a user input by use of which a user accepts the proposed configuration. If, on the other hand, the user rejects the proposed configuration, no transmission to the at least one sanitary device 20 takes place in step 270.

Figure 3:
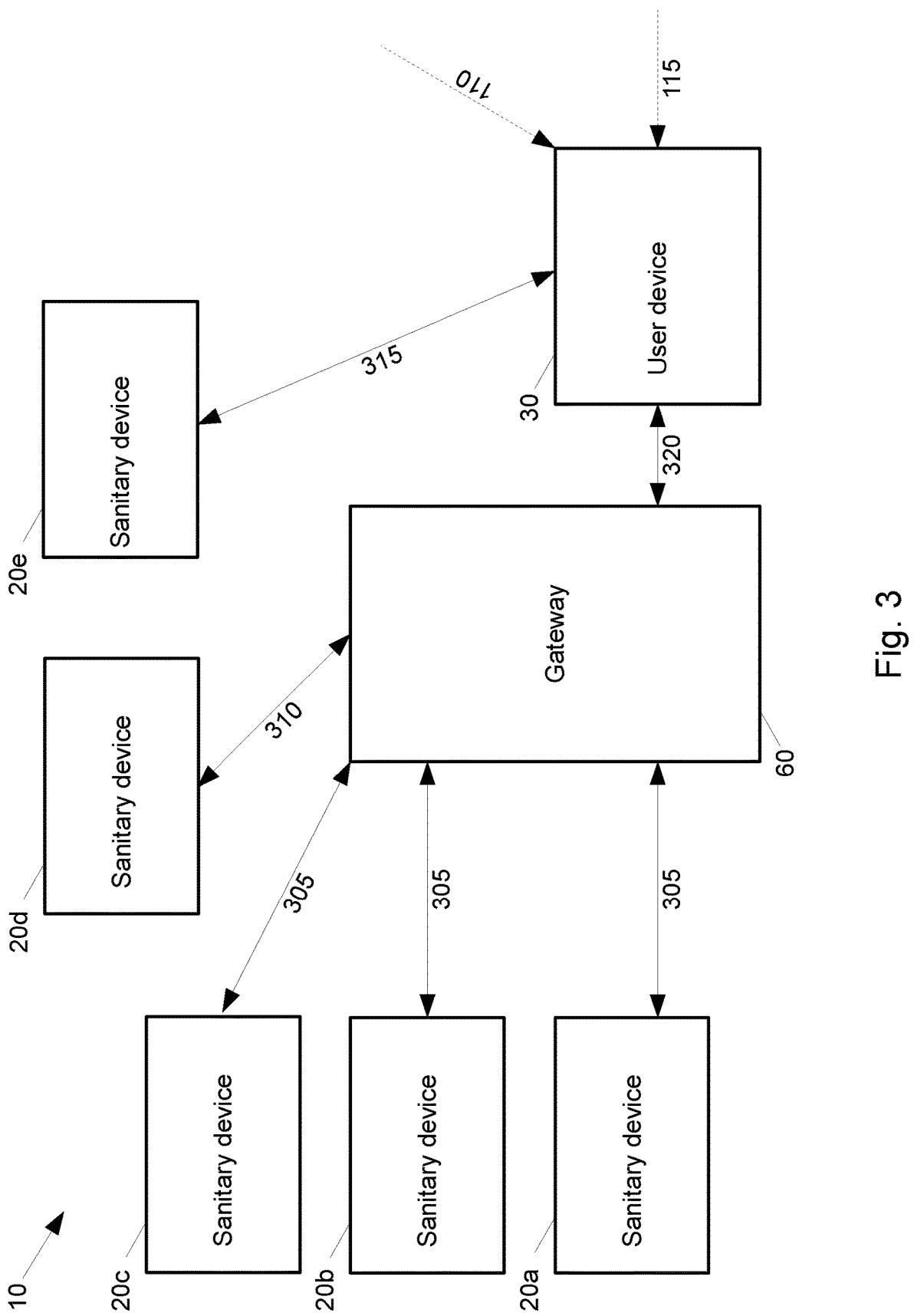
FIG. 3 is a schematic block diagram showing an example of communication paths between several sanitary devices and a user device within the sanitary technology diagnostic system.

FIG. 3 shows a further embodiment example of communication paths between several sanitary devices 20 and a user device 30 within the sanitary technology diagnostic system 10 according to the solution introduced here. FIG. 3 can be regarded as an excerpt or supplement to FIG. 1, which is evident from the indicated communication paths 110 and 115.

In the present case, five sanitary devices 20*a*-20*e* are part of the system 10, wherein these are communicatively connected to the user device 30 in different ways.

The sanitary devices 20*a*, 20*b* and 20*c* are connected to a gateway 60 by use of a communication path 305, wherein this communication path 305 can represent, for example, a wireless Bluetooth connection. The sanitary device 20*d* is also connected to the gateway 60, but via a wired communication path 310, which can be realized in the form of, for example, an Ethernet connection.

Deviating from this, the sanitary device 20*e* is not connected to the gateway 60, but has a direct communication path 315 to the user device 30, which in turn can be realized by use of a Bluetooth connection, for example.

The user device 30 and the gateway 60 are in communication via the communication path 320, which in this case also can be a Bluetooth connection.

The system explained above allows the simultaneous use of sanitary devices 20*a*-20*d*, which can only be integrated via gateway 60, and a sanitary facility 20*e*, for which only a direct connection to a user facility 30 is possible. This embodiment example is purely exemplary and is not to be understood as limiting. For example, it may also be provided that several sanitary devices 20*e* communicate directly, i.e., without gateway 60, with the user device 30 and/or that all sanitary devices are connected to the gateway 60 via a communication path 310 in accordance with a wired connection.

The figures described above and the examples of embodiment examples explained in connection therewith serve only to explain the solution introduced here and are not limiting.

LIST OF REFERENCE SYMBOLS

The following reference symbols are used in this description:
10 Sanitary technology diagnostic system
20 Sanitary device(s)
20*a*-20*e* Sanitary facilities
30 User device
40 Server device
50 Diagnostic device
60 Gateway
105 Communication path sanitary device(s)↔user device
110 Communication path user device↔server device
115 Communication path user device↔diagnostic device
120 Communication path server device↔diagnostic device
205-270 Method step
305 Communication path sanitary device↔gateway
310 Communication path sanitary device↔gateway
315 Communication path sanitary device↔user device
320 Communication path gateway↔user device

What is claimed is:
1. A sanitary technology diagnostic system comprising:
at least one sanitary device;
a user device;
a server device; and
a diagnostic device;
the user device being adapted to
request and receive device information linked to an identifier of the at least one sanitary device from the at least one sanitary device,
generate a service number,
send a data set comprising the service number and the received device information to the server device, and
send a notification that includes the service number;
the server device being adapted to
receive and store the data set; and
the diagnostic device being adapted to
receive the notification; and
request and receive the data set from the server device using the service number.

2. A system according to claim 1, wherein the diagnostic device is further adapted to create a configuration for the at least one sanitary device and to send it to the server device for storage.

3. A system according to claim 2, wherein the user device is further adapted to request and receive the configuration from the server device and to send it to the at least one sanitary device.

4. A system according to claim 3, wherein the user device is further adapted to request and receive the configuration from the server device and to send it to the at least one sanitary device depending on a user input.

5. A system according to claim 1, wherein the received device information comprises at least one error code concerning the at least one sanitary device.

6. A system according to claim 1, wherein the received device information comprises at least one log file concerning the at least one sanitary device.

7. A system according to claim 1, wherein the data set comprising the device information further comprises a fault description.

8. A system according to claim 1, wherein the user device is arranged to send the notification comprising the service number to the server device and/or to the diagnostic device.

9. A system according to claim 8, wherein the diagnostic device is adapted to check the server device for the presence of the notification in the event that the notification is sent to the server device.

10. A system according to claim 1, wherein the diagnostic device is further adapted to send a further notification to the user device.

11. A system according to claim 1, wherein a communication between the at least one sanitary device and the user device is provided wirelessly by use of Bluetooth.

12. A system according to claim 1, wherein a communication between the at least one sanitary device and the user device is provided by use of a gateway, wherein a communication between the at least one sanitary device and the gateway is provided wirelessly or wired, and a communication between the gateway and the user device is provided wirelessly by use of Bluetooth.

13. A system according to claim 1, wherein only the user device, the server device, and the diagnostic device are adapted to establish a direct connection to the Internet.

14. A system according to claim 13, wherein the communication between the at least one sanitary device and the gateway is provided wirelessly by use of Bluetooth.

15. A sanitary technology diagnostic method comprising:
requesting and receiving device, by a user device, information linked to an identifier of at least one sanitary device from the at least one sanitary device;
generating a service number by the user device;
sending a data set comprising the service number and the device information to a server device by the user device;
storing the received data set by the server device;
sending a notification comprising the service number by the user device;
receiving the notification by the diagnostic device; and
requesting and receiving the data set from the server device using the service number by the diagnostic device.

16. A sanitary technology diagnostic method according to claim 15, further comprising:
creating a configuration for the at least one sanitary device by the diagnostic device, and sending the configuration to the server device for storage by the diagnostic device.

17. A sanitary technology diagnostic method according to claim 16, further comprising:

requesting and receiving the configuration from the server device by the user device, and sending the configuration to the at least one sanitary device.

18. A non-transitory machine readable storage medium storing instructions, execution of which by at least one processor in at least one processing system causes performance of sanitary operations comprising:

requesting and receiving device information linked to an identifier of at least one sanitary device from the at least one sanitary device, by the user device;

generating a service number;

sending a data set comprising the service number and the device information to a server device;

storing the received data set by the server device;

sending a notification comprising the service number by the user device;

receiving the notification by the diagnostic device; and requesting and receiving the data set from the server device using the service number by the diagnostic device.

19. A non-transitory machine readable storage medium according to claim 18, further comprising:

creating a configuration for the at least one sanitary device by the diagnostic device, and sending the configuration to the server device for storage by the diagnostic device.

20. A non-transitory machine readable storage medium according to claim 19, further comprising:

requesting and receiving the configuration from the server device by the user device, and sending the configuration to the at least one sanitary device.

* * * * *